United States Patent
Lin et al.

(10) Patent No.: US 11,159,785 B1
(45) Date of Patent: Oct. 26, 2021

(54) TESTING PLATFORM FOR HDMI ENHANCED AUDIO RETURN CHANNEL

(71) Applicant: GOOGLE LLC, Mountain View, CA (US)

(72) Inventors: Che-Ming Lin, Taipei (TW); Qi-Sheng Liu, New Taipei (TW); Weiming Liu, New Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/148,361

(22) Filed: Jan. 13, 2021

(51) Int. Cl.
*H04N 17/00* (2006.01)
*H04N 7/015* (2006.01)
*H04N 7/035* (2006.01)

(52) U.S. Cl.
CPC ........... *H04N 17/004* (2013.01); *H04N 7/015* (2013.01); *H04N 7/035* (2013.01)

(58) Field of Classification Search
CPC ...... H04N 17/004; H04N 17/02; H04N 17/00; H04N 17/04; H04N 21/2402; H04N 21/43635; H04N 7/015; H04N 7/035; H04N 2017/006
USPC .... 348/192, 180, 181; 725/64–68, 121, 123, 725/124
See application file for complete search history.

(56) References Cited

U.S. PATENT DOCUMENTS

| | | | |
|---|---|---|---|
| 2014/0226026 A1 | 8/2014 | Claramond et al. | |
| 2014/0236524 A1 | 8/2014 | Frediani et al. | |
| 2018/0109837 A1* | 4/2018 | Sprenger | H04N 21/47217 |
| 2018/0288106 A1 | 10/2018 | Ranade et al. | |
| 2020/0359084 A1* | 11/2020 | Lin | H04B 10/691 |
| 2020/0365112 A1* | 11/2020 | Oh | H04N 21/4722 |

FOREIGN PATENT DOCUMENTS

CN 106657986 4/2019

* cited by examiner

*Primary Examiner* — Sherrie Hsia
(74) *Attorney, Agent, or Firm* — Byrne Poh LLP

(57) ABSTRACT

A bidirectional media communication channel testing platform includes an HDMI testing device including a video input port and an audio output port; a plurality of media streaming devices, each including a video transmission channel and an audio return channel; and a bidirectional switch including a video path and an audio path. The video path is configured to selectively couple the video input port of the HDMI testing device to a video transmission channel of a selected one of the plurality of media streaming devices, and the audio path is configured to concurrently couple the audio output port of the HDMI testing device to the audio return channel of each of the plurality of media streaming devices, regardless of a switching state of the video path of the bidirectional switch.

16 Claims, 4 Drawing Sheets

US 11,159,785 B1

TESTING PLATFORM FOR HDMI ENHANCED AUDIO RETURN CHANNEL

TECHNICAL FIELD

This relates generally to audio/video media streaming devices, and in particular to a testing platform for such media streaming devices.

BACKGROUND

High-Definition Multimedia Interface (HDMI) is a digital multimedia interface for transmitting audio and video data between connected devices. An update to the HDMI specification introduced an enhanced Audio Return Channel (eARC), which increases bandwidth and addresses connectivity issues when routing audio data through the connected devices. To support eARC signals, the HDMI specification re-appropriates two pins (pins 14 and 19) for use as a differential pair. Media streaming devices that support the updated HDMI specification may require additional circuit board components to support the eARC functionality. Subjecting the additional components to validation testing may introduce challenges due to differences in the way audio and video signals respond to testing hardware.

SUMMARY

When subjected to HDMI validation testing (e.g., during manufacturing), a plurality of media streaming devices may be concurrently coupled to a single HDMI testing device in order to increase efficiency. In such a testing platform, the HDMI video and audio signals may pass through a switching component (e.g., a bidirectional switch) configured to route the video and audio signals between the HDMI testing device and each of the media streaming devices being tested. HDMI video signals may be routed from the HDMI testing device to one media streaming device at a time through a multiplexer of the switching component. However, eARC signals may be susceptible to degradation if multiplexed in the same manner as HDMI video signals. As such, this disclosure describes a testing platform with a switching component that (i) selectively couples an HDMI testing device to the video channel of one media streaming device at a time, and (ii) concurrently couples the HDMI testing device to the audio channel of every media streaming device that is coupled to the testing platform. Such a switching component optimizes both testing efficiency (by concurrently supporting a plurality of media streaming devices) and testing accuracy (by minimizing degradation of eARC audio signals).

Specifically, a bidirectional media communication channel testing platform may include an HDMI testing device including a video input port and an audio output port; a plurality of media streaming devices, each including a video transmission channel and an audio return channel; and a bidirectional switch including a video path and an audio path. The video path may be configured to selectively couple the video input port of the HDMI testing device to a video transmission channel of a selected one of the plurality of media streaming devices. The audio path may be configured to concurrently couple the audio output port of the HDMI testing device to the audio return channel of each of the plurality of media streaming devices, regardless of a switching state of the video path of the bidirectional switch. Each of the plurality of media streaming devices may be configured to selectively transmit a video test pattern across the video path for analysis by the HDMI testing device, and the HDMI testing device may be configured to transmit an eARC audio test pattern across the audio path for analysis by each of the plurality of media streaming devices. While the video test patterns are selectively transmitted by one media streaming device at a time, the eARC test patterns are transmitted to each of the media streaming devices concurrently.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Figure 1:
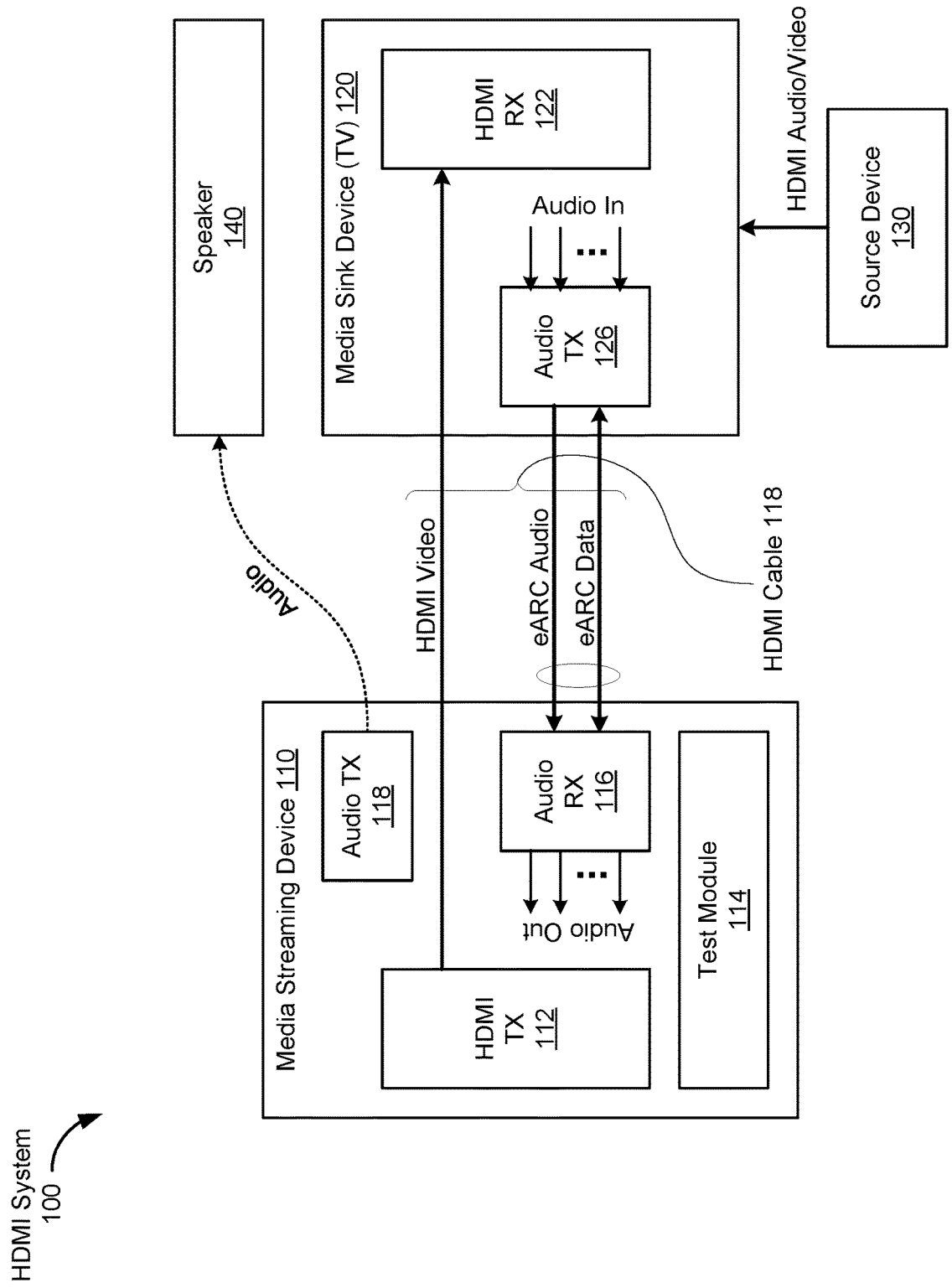
FIG. 1 is a functional diagram of an HDMI system including eARC functionality in accordance with some implementations.

An HDMI-compliant media streaming device may both transmit and receive media data. An example system is described with reference to the HDMI system 100 in FIG. 1. In the HDMI system 100, a media streaming device 110 may transmit HDMI video data to and receive eARC audio data from a media sink device 120. The media streaming device 110 may be a digital media player (e.g., in the form factor of a dongle) that plugs into the media sink device 120 via an HDMI cable 118. The media streaming device 110 may wirelessly receive digital media content (e.g., from a router in a home wireless network) and stream the received content to the media sink device 120 via the HDMI cable 118. The media sink device 120 may be a television or any other type of display. In variations of the system 100 (not shown in FIG. 1), the media streaming device 110 may be plugged into one or more intermediate HDMI-compatible devices, such as an audio/video receiver, to which the media sink device 120 is also connected. Such an intermediate device may forward video data from the media streaming device 110 to the media sink device 120 while processing and outputting audio data.

The media streaming device 110 includes an HDMI video transmitter 112 that is configured to transmit video data via one or more video transmission channels of the HDMI cable 118. For example, the video transmitter 112 may transmit video data via one or more transition-minimized differential signaling (TMDS) channels of the HDMI cable 118 (e.g., data channel 0 via pins 7 and 9, data channel 1 via pins 4 and 6, and/or data channel 2 via pins 1 and 3 with respect to data clock pins 10 and 12). The media sink device 120 includes an HDMI video receiver 122 that is configured to receive the video data and process (or provide for processing) the video data for display.

The media sink device 120 includes an audio transmitter 126 configured to transmit audio data (eARC audio signals and eARC data signals) via the audio return channel of the HDMI cable 118. For example, the audio transmitter 126 may transmit audio data via HDMI pins 14 and 19. The media streaming device 110 includes an audio receiver 116 that is configured to receive the audio data and process (or provide for processing) the audio data for output to one or more speakers. In some implementations, the media streaming device 110 includes an audio transmitter 118 that is configured to wirelessly transmit the output signals received by the audio receiver 116. The audio transmitter 118 may transmit the audio signals to a wireless speaker 140 (e.g., a WiFi or Bluetooth speaker).

An optional source device 130 may be configured to transmit video and/or audio data to the media sink device 120 via a wireless or wired connection. The source device 130 may be another media streaming device (similar to device 110) or any other type of device configured to transmit digital media data for output at a display and/or speaker.

The eARC functionality adds the ability to send audio data upstream to the media streaming device 110. The eARC channel utilizes two lines from the HDMI connector: the previously unused Reserved/Utility/HEAC pin (pin 14) and the Hot Plug Detect pin (pin 19). If only audio return channel (ARC) transmission is required, a single ended mode signal using one line (pin 14) can be used; otherwise, eARC audio data is transmitted as a differential signal over the pair of lines, and ARC audio data may be a common mode component of the pair.

The eARC line is an audio link meant to replace other cables between the media sink device 120 (e.g., the streaming dongle and/or speaker system) and the media sink device 120 (e.g., the TV). The eARC lines are used when the media sink device 120 (e.g., the TV) is the device that generates or receives the audio and/or video stream instead of the media streaming device 110. A typical case is the running of an app on a smart TV, but reproduction of audio is handled by the other equipment (e.g., speaker 140). Without the eARC lines, the audio output from the TV would need to be routed by another cable (e.g., optical fiber or coax), into the speaker system.

To support eARC, the media streaming device 110 is configured to process digital media data in a bidirectional manner. For example, an active video path may include the HDMI transmitter 112 and the HDMI receiver 122 as described above (sometimes referred to as a downstream path), and an active audio path may include an audio source in the source device 130, the audio transmitter 126, the audio receiver 116, the audio transmitter 118, and/or the speaker 140 (sometimes referred to as an upstream path). A testing platform configured to perform validation testing on both of the aforementioned media paths with respect to one or more of the media streaming devices 110 is described below with reference to FIGS. 2-4.

The media streaming device 110 includes a test module 114 for implementing one or more of the operations described below with reference to video testing (e.g., the transmission of video test patterns 214 described with reference to the video transmitter 212 in FIG. 2) and audio testing (e.g., the analysis of audio reference patterns 218 and audio test patterns 238 described with reference to the audio analyzer 216 in FIG. 2).

Figure 2:
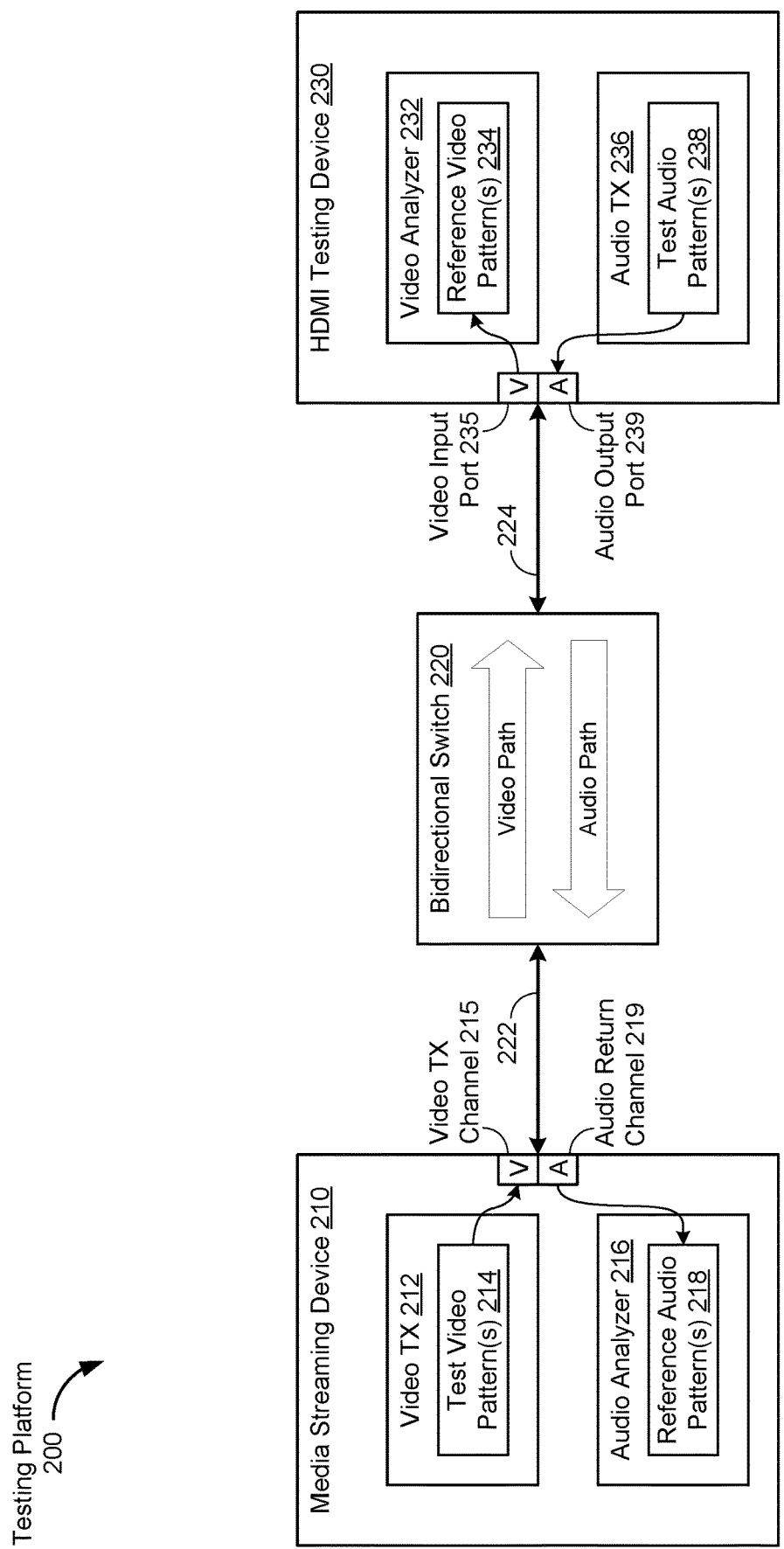
FIG. 2 is a functional diagram of an HDMI testing system in accordance with some implementations.

FIG. 2 is a functional diagram of an HDMI testing platform 200 in accordance with some implementations. The testing platform 200 is configured to test the video and audio paths of a media streaming device 210 using a bidirectional HDMI switch 220 to couple the media streaming device 210 to an HDMI testing device 230.

The media streaming device 210 includes a video transmitter 212 (corresponding to the HDMI transmitter 112, FIG. 1). While in the video portion of a testing mode, the video transmitter 212 is configured to transmit one or more test video patterns 214 to the HDMI testing device 230 via a video transmission channel 215 (e.g., HDMI data channel 0, 1, and/or 2 as described above). The test video pattern(s) 214 may be video file(s) such as TMDS signal(s), or any other video data, the fidelity of which can be analyzed once it is received at the HDMI testing device 230.

The media streaming device 210 includes an audio analyzer 216 (corresponding to or associated with the audio receiver 116, FIG. 1). While in the audio portion of a testing mode, the audio analyzer 216 is configured to analyze one or more test audio patterns 238 received from the HDMI testing device 230 via an audio return channel 219 (e.g., eARC channel as described above). The test audio pattern(s) 238 may be audio file(s) such as eARC signal(s), or any other audio data, the fidelity of which can be analyzed by the audio analyzer 216 by comparing the test audio pattern(s) 238 to one or more reference audio patterns 218 stored in local memory of the media streaming device 210.

The HDMI testing device 230 includes an audio transmitter 236. While in the audio portion of a testing mode, the audio transmitter 236 is configured to transmit one or more test audio patterns 238 to the media streaming device 210 via an audio output port 239. The test audio pattern(s) 238 may be audio file(s), signal(s), or any other data, the fidelity of which can be analyzed once it is received at the media streaming device 210.

The HDMI testing device 230 includes a video analyzer 230. While in the video portion of a testing mode, the video analyzer 232 is configured to analyze one or more test video patterns 214 received from the media streaming device 210 via a video input port 235. The test video pattern(s) 214 may be video file(s), signal(s), or any other data, the fidelity of which can be analyzed by the video analyzer 232 by comparing the test video pattern(s) 214 to one or more reference video patterns 234 stored in local memory of the HDMI testing device 230.

The media streaming device 210 is coupled to the bidirectional switch 220 via an HDMI link 222 (e.g., an HDMI cable). One end of the HDMI link 222 may be embedded in the media streaming device 210 (e.g., for media streaming devices in the form factor of a dongle). Alternatively, the HDMI link 222 may be distinct from the media streaming device 210 (e.g., a distinct cable), with one end plugged into the media streaming device 210 and the other end plugged into the bidirectional switch 220. Optionally, while one end of the HDMI link 222 may be embedded in or otherwise physically coupled to the media streaming device 210, the other end of the HDMI link 222 may be coupled to the bidirectional switch 220 via an intermediate HDMI cable (e.g., acting as an extension cable) (not shown).

The HDMI testing device 230 is coupled to the bidirectional switch 220 via an HDMI link 224. The HDMI link 224 may be an HDMI cable if the bidirectional switch 220 is distinct from the HDMI testing device 230. Alternatively, the HDMI link 224 may be embedded in the HDMI testing device 230 if the bidirectional switch 220 is integrated or otherwise physically coupled to the HDMI testing device 230.

The bidirectional switch 220 routes video signals between the media streaming device 210 and the HDMI testing device 230 via a selectively switched video path, described in more detail below with reference to FIG. 4. The bidirectional switch 220 routes audio signals between the HDMI testing device 230 and the media streaming device 210 via an audio path, described in more detail below with reference to FIG. 4.

The testing platform 200 tests the video transmission capabilities of the media streaming device 210 (the video transmitter 212/HDMI transmitter 112, video transmission channel 215, and all circuit board traces, connectors, and other hardware components configured to support such video transmission capabilities). The video transmitter 212 (corresponding to HDMI transmitter 112, FIG. 1) of the media streaming device 210 transmits one or more test video patterns 214 to the HDMI testing device 230. The media streaming device 210 transmits the test video pattern(s) via the video transmission channel 215 of the media streaming device 210 (corresponding to the HDMI Video signal path, FIG. 1), the HDMI link 222, the bidirectional switch 220, the HDMI link 224, and the video input port 235 of the HDMI testing device 230. The video analyzer 232 of the HDMI testing device 230 analyzes the test video pattern(s) received at the video input port 235 by comparing the test video pattern(s) to one or more reference video patterns 234 stored in local memory of the HDMI testing device 230. Based on the comparison (e.g., if a received test video pattern matches a stored reference video pattern to a predetermined degree), the HDMI testing device 230 characterizes a video fidelity characteristic of the video path of the media streaming device 210. Stated another way, based on the comparison, the HDMI testing device 230 characterizes a video fidelity characteristic of the video portion of the bidirectional communication channel of the media streaming device 210 (the bidirectional communication channel comprising the video transmission channel 215 and the audio return channel 219). Example characterizations include a passing test result, a fidelity grade, a fidelity percentage, and so forth.

The testing platform 200 tests the audio return capabilities of the media streaming device 210 (the audio analyzer 216/audio receiver 116, audio return channel 219, and all circuit board traces, connectors, and other hardware components configured to support such audio return capabilities). The audio transmitter 236 of the HDMI testing device 230 transmits one or more test audio patterns 238 to the media streaming device 210. The HDMI testing device 230 transmits the test audio pattern(s) via the audio output port 239 of the HDMI testing device 230, the HDMI link 224, the bidirectional switch 220, the HDMI link 222, and the audio return channel 219 of the media streaming device 210. The audio analyzer 216 of the media streaming device 210 analyzes the test audio pattern(s) received at the audio return channel 219 by comparing the test audio pattern(s) to one or more reference audio patterns 218 stored in local memory of the media streaming device 210. Based on the comparison (e.g., if a received test audio pattern matches a stored reference audio pattern to a predetermined degree), the media streaming device 210 characterizes an audio fidelity characteristic of the audio path of the media streaming device 210. Stated another way, based on the comparison, the media streaming device 210 characterizes an audio fidelity characteristic of the audio portion of the bidirectional communication channel of the media streaming device 210 (the bidirectional communication channel comprising the video transmission channel 215 and the audio return channel 219). Example characterizations include a passing test result, a fidelity grade, a fidelity percentage, and so forth.

In some implementations, upon completion of comparing the audio patterns and characterizing the audio fidelity characteristic of the audio path, the media streaming device 210 transmits to the HDMI testing device 230 data regarding the audio fidelity characterization (e.g., an audio test result). Upon receiving the audio fidelity characterization data, the HDMI testing device 230 may combine the audio fidelity characterization data with video fidelity characterization data (obtained based on video pattern comparisons as described above), and characterize the bidirectional media communication channel (including the video transmission channel 215 and the audio return channel 219) with regard to the media streaming device 210 based on the audio fidelity characteristic data and the video fidelity characteristic data.

While the testing platform 200 depicts a single media streaming device 210 coupled to the HDMI testing device 230 via the bidirectional switch 220, it may be advantageous to couple a plurality of media streaming devices 210 to a single HDMI testing device 230 via a bidirectional switch 220 for purposes of testing efficiency.

Figure 3:
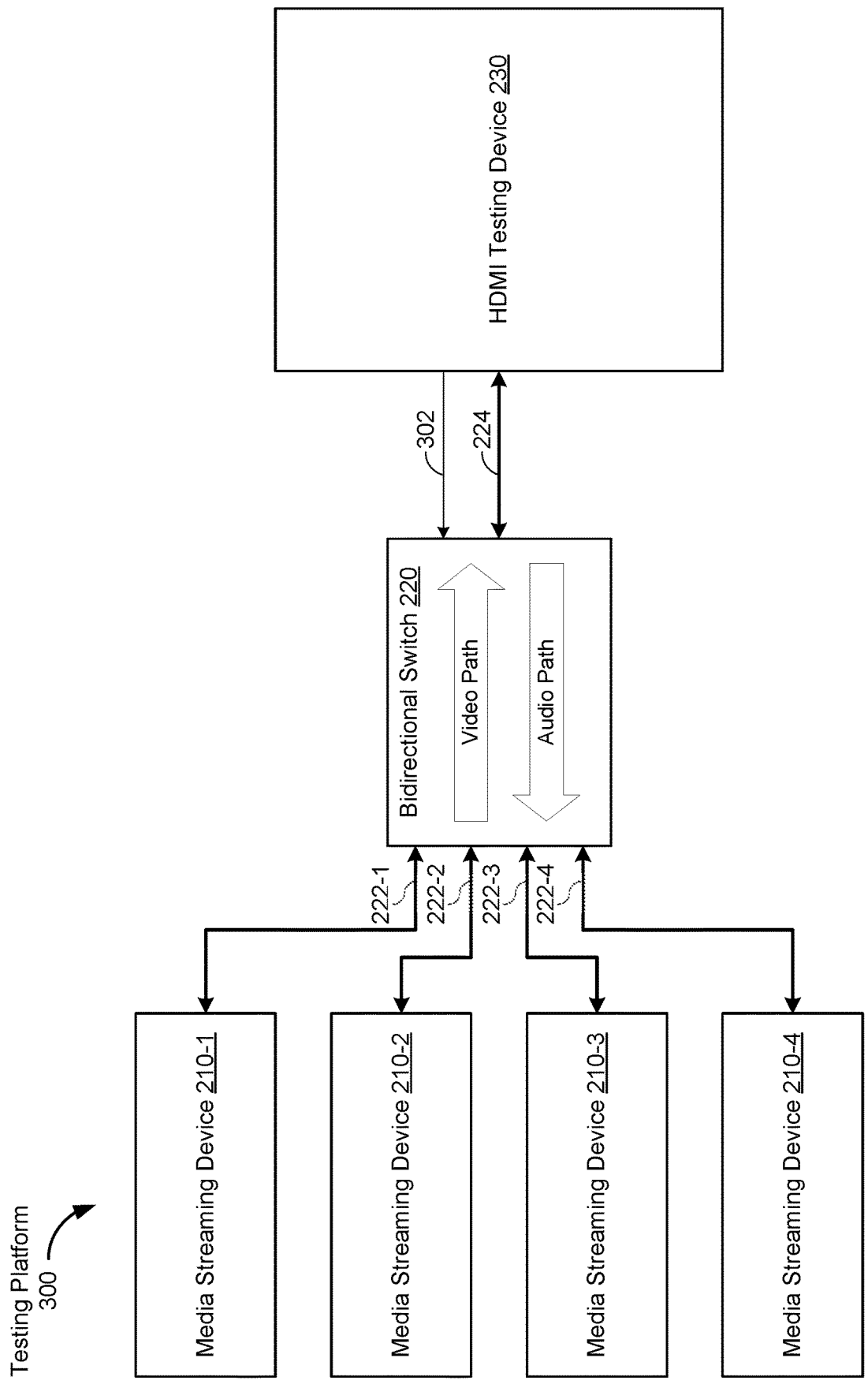
FIG. 3 is a functional diagram of an HDMI testing system with a plurality of media streaming devices in accordance with some implementations.

FIG. 3 is a functional diagram of an HDMI testing platform 300 with a plurality of media streaming devices 210 in accordance with some implementations. Features shared with FIG. 2 are similarly numbered, and some are not further discussed for purposes of brevity. For example, each media streaming device 210 corresponds to the media streaming device 210 described above with reference to FIG. 2. While FIG. 3 depicts four media streaming devices 210, the concepts described herein apply equally to scenarios in which fewer than four or greater than four media streaming devices 210 are coupled to a single HDMI testing device 230 through a bidirectional switch 220.

For a testing platform in which a plurality of media streaming devices 210 are tested by the same HDMI testing device 230 (such as the testing platform 300), the HDMI testing device 230 may successively test each media streaming device 210, one at a time, in order to ensure accurate results. The bidirectional switch 220 successively couples the respective video channels for each media streaming device 210 to the HDMI testing device 230. However, switching of the respective audio channels for each media streaming device 210 may cause degradation of the audio signals, thereby negatively affecting test results for the audio path. As such, the bidirectional switch 220 is configured to selectively couple the respective video channels for each media streaming device 210 while concurrently coupling the respective audio channels for each media streaming device 210.

The HDMI testing device 230 may control the bidirectional switch 220 with a control signal 302. For example, subsequent to characterizing the bidirectional media communication channel with regard to a current media streaming device (e.g., 210-1), the HDMI testing device 230 may transmit to the bidirectional switch 220 a control signal 302 configured to (i) decouple the video input port of the HDMI testing device 230 from the video transmission channel of the current media streaming device (e.g., 210-1), and (ii) couple the video input port of the HDMI testing device 230 to the video transmission channel of the next media streaming device to be tested (e.g., 210-2).

Regardless of the coupling and decoupling of the respective video channels between the two media streaming devices (e.g., 210-1 and 210-2) and the HDMI testing device 230, the respective audio channels of the two media streaming devices remain concurrently coupled to the HDMI testing device 230. Stated another way, the audio output port of the HDMI testing device 230 remains concurrently coupled to the respective audio return channels of the each media streaming device under test (e.g., 210-1 and 210-2)

even while the bidirectional switch 220 selectively couples and decouples the video input port of the HDMI testing device 230 to/from the video transmission channels of the respective media streaming devices under test. As a result, the HDMI video pins/lines/channel of only one media streaming device 210 at a time will be connected to the HDMI testing device 230 via the bidirectional switch 220, but the HDMI audio (eARC) pins/lines/channel of all of the media streaming devices 210 under test are concurrently connected to the HDMI testing device 230.

Upon causing the bidirectional switch 220 to decouple the video channel of a first media streaming device 210-1 and couple the video channel of a second media streaming device 210-2, the HDMI testing device 230 may initiate validation testing of the video and audio paths with respect to the second media streaming device 210-2. The HDMI testing device 230 may initiate the validation testing for a given device by transmitting instructions over the HDMI links 224 and 222 to the given media streaming device 210. Such instructions may cause the media streaming device 210 to enter a validation testing mode in which the media streaming device 210 transmits (via its video transmission channel) video test pattern(s) to the HDMI testing device 230, receives (via its audio return channel) audio test pattern (s) from the HDMI testing device 230, commence pattern comparisons, and performs fidelity characterizations in the manner described above with reference to FIG. 2.

Figure 4:
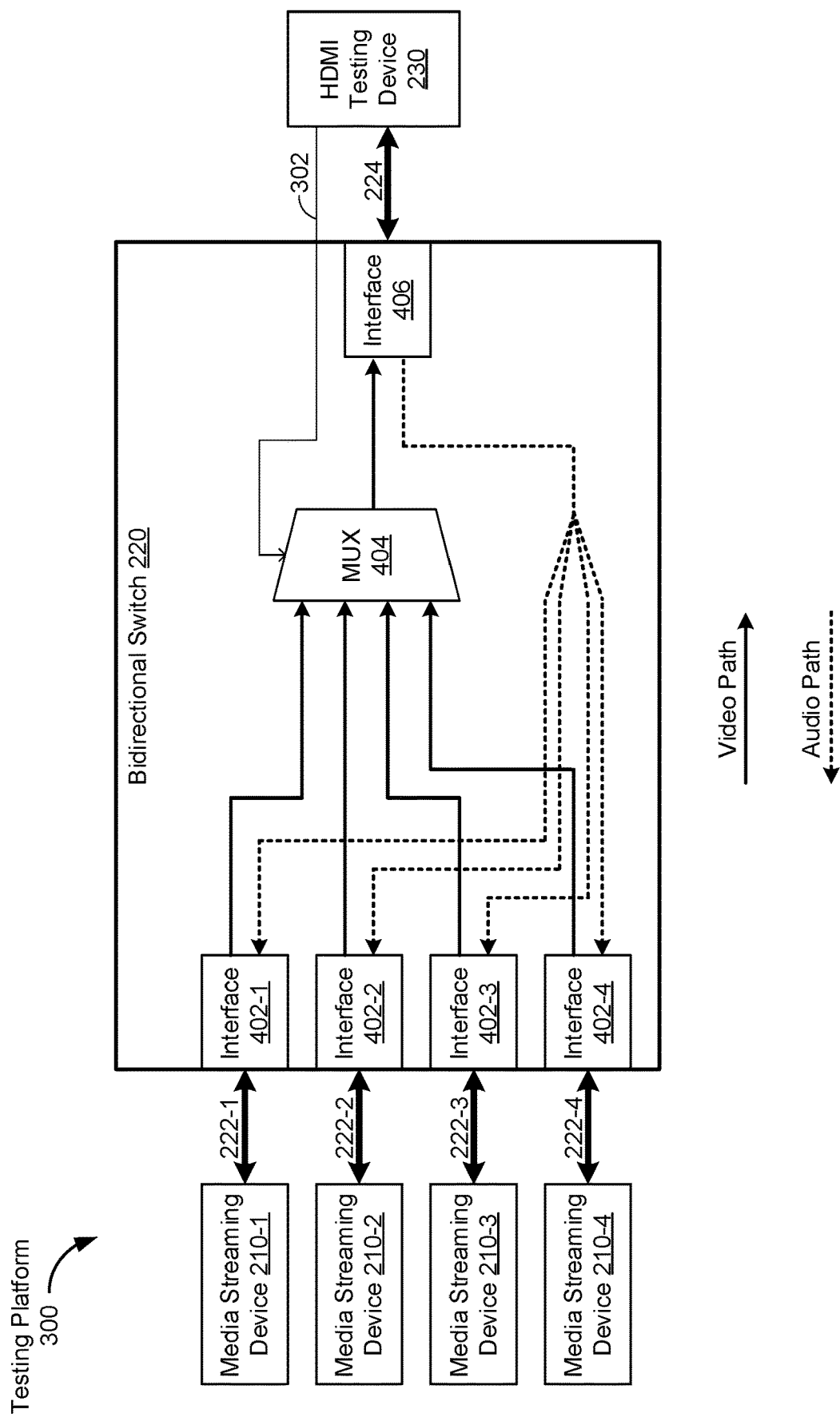
FIG. 4 is a functional diagram of a bidirectional switch of an HDMI testing system in accordance with some implementations.

FIG. 4 is a detailed diagram of the bidirectional switch 220 of the HDMI testing system 300 in accordance with some implementations. Features shared with FIGS. 2 and 3 are similarly numbered, and some are not further discussed for purposes of brevity.

The bidirectional switch 220 is configured to (i) selectively couple the video input port 235 of the HDMI testing device 230 to a respective video transmission channel of one of a plurality of media streaming devices 210, and (ii) concurrently couple the respective audio return channels of each of the media streaming devices 210 to the audio output port 239 of the HDMI testing device 230.

The bidirectional switch 220 includes an interface 402 for the connection to each media streaming device 210 via a respective HDMI link 222, and an interface 406 for the connection to the HDMI testing device 230 via the HDMI link 224. At each interface, a respective HDMI link is separated into video channels (e.g., TMDS channel 0, TMDS channel 1, and/or TMDS channel 2) and audio channels (e.g., or eARC). Video signals communicated via the video channels are routed through respective video paths as depicted in FIG. 4. Likewise, audio signals communicated via the audio channels are routed through respective audio paths as depicted in FIG. 4.

The video path for each media streaming device 210 is routed through a multiplexer 404, which is controlled by the control signal 302. The HDMI testing device 230 transmits the control signal 302 upon completion of testing for a first media streaming device (e.g., 210-1) in order to commence testing for a second media streaming device (e.g., 210-2), as described above with reference to FIG. 3. In accordance with the control signal 302, the multiplexer 404 selectively couples the video path corresponding to one of the plurality of media streaming devices 210 to the HDMI testing device 230.

Regardless of a switching state of the multiplexer 404 (e.g., whether the multiplexer 404 is coupling a first or second media streaming device 210), the audio path for each of the media streaming devices 210 is concurrently coupled to the HDMI testing device 230. As a result, video pattern testing may be optimized (by connecting only one media streaming device 210 to the HDMI testing device 230 at a time) without degrading audio fidelity (by sparing the audio path of multiplexing hardware that may interfere with audio signals).

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A method of testing a bidirectional media communication channel, the method comprising:
   at a first media streaming device including a video transmission channel and an audio return channel:
      transmitting, via the video transmission channel, a video test pattern to a high-definition multimedia interface (HDMI) testing device;
      receiving, via the audio return channel, an audio test pattern from the HDMI testing device;
      comparing the received audio test pattern with an audio reference pattern stored in local memory of the first media streaming device; and
      characterizing an audio fidelity characteristic of the bidirectional communication channel based on the comparing of the received audio test pattern with the audio reference pattern.

2. The method of claim 1, further comprising:
   at the HDMI testing device:
      receiving, via a video input port selectively coupled to the video transmission channel, the video test pattern;
      transmitting, via an audio output port coupled to the audio return channel, the audio test pattern;
      comparing the received video test pattern with a video reference pattern stored in local memory of the HDMI testing device; and
      characterizing a video fidelity characteristic of the bidirectional communication channel based on the comparing of the received video test pattern with the video reference pattern.

3. The method of claim 2, further comprising:
   at the first media streaming device:

transmitting to the HDMI testing device an audio test result based on the characterizing of the audio fidelity characteristic;
at the HDMI testing device:
receiving from the first media streaming device an audio test result;
determining a video test result based on the characterizing of the video fidelity characteristic; and
characterizing the bidirectional media communication channel with regard to the first media streaming device based on the audio fidelity characteristic and the video fidelity characteristic.

4. The method of claim 1, wherein:
the video test pattern is a transition-minimized differential signal (TMDS) video signal; and
the audio test pattern is an enhanced audio return channel (eARC) audio signal.

5. The method of claim 1, further comprising:
at the HDMI testing device:
subsequent to characterizing the bidirectional media communication channel with regard to the first media streaming device, transmitting to a bidirectional switch a control signal configured to (i) decouple the HDMI testing device from the video transmission channel of the first media streaming device, and (ii) couple the HDMI testing device to a video transmission channel of a second media streaming device; and
at the second media streaming device:
transmitting, via the video transmission channel of the second media streaming device, a second video test pattern to the HDMI testing device; and
receiving, via an audio return channel of the second media streaming device, a second audio test pattern from the HDMI testing device.

6. The method of claim 5, wherein the HDMI testing device is concurrently coupled to the audio return channel of the first media streaming device and the audio return channel of the second media streaming device.

7. A bidirectional media communication channel testing platform, comprising:
an HDMI testing device including a video input port, an audio output port, and memory storing a video reference pattern; and
a first media streaming device including a video transmission channel, an audio return channel, and memory storing an audio reference pattern, wherein the first media streaming device configured to:
transmit, via the video transmission channel, a video test pattern to the HDMI testing device;
receive, via the audio return channel, an audio test pattern from the HDMI testing device;
compare the received audio test pattern with the audio reference pattern stored in the memory of the first media streaming device; and
characterize an audio fidelity characteristic of the bidirectional communication channel based on the comparing of the received audio test pattern with the audio reference pattern.

8. The bidirectional media communication channel testing platform of claim 7, wherein:
the video input port of the HDMI testing device is selectively coupled to the video transmission channel of the first media streaming device;
the audio output port of the HDMI testing device is coupled to the audio return channel of the first media streaming device; and the HDMI testing device is configured to:
receive, via the video input port, the video test pattern from the first media streaming device;
transmit, via the audio output port, the audio test pattern to the first media streaming device;
compare the received video test pattern with the video reference pattern stored in the memory of the HDMI testing device; and
characterize a video fidelity characteristic of the bidirectional communication channel based on the comparing of the received video test pattern with the video reference pattern.

9. The bidirectional media communication channel testing platform of claim 8, wherein:
the first media streaming device is further configured to:
transmit to the HDMI testing device an audio test result based on the characterizing of the audio fidelity characteristic; and
the HDMI testing device is further configured to:
receive from the first media streaming device the audio test result;
determine a video test result based on the characterizing of the video fidelity characteristic; and
characterize the bidirectional media communication channel with regard to the first media streaming device based on the audio fidelity characteristic and the video fidelity characteristic.

10. The bidirectional media communication channel testing platform of claim 7, wherein:
the video test pattern is a TMDS video signal; and
the audio test pattern is an eARC audio signal.

11. The bidirectional media communication channel testing platform of claim 7:
the HDMI testing device is further configured to:
subsequent to characterizing the bidirectional media communication channel with regard to the first media streaming device, transmit to a bidirectional switch a control signal configured to (i) decouple the HDMI testing device from the video transmission channel of the first media streaming device, and (ii) couple the HDMI testing device to a video transmission channel of a second media streaming device; and
the second media streaming device is further configured to:
transmit, via the video transmission channel of the second media streaming device, a second video test pattern to the HDMI testing device; and
receive, via an audio return channel of the second media streaming device, a second audio test pattern from the HDMI testing device.

12. The bidirectional media communication channel testing platform of claim 11, wherein the HDMI testing device is concurrently coupled to the audio return channel of the first media streaming device and the audio return channel of the second media streaming device.

13. A bidirectional media communication channel testing platform, comprising:
an HDMI testing device including a video input port and an audio output port;
a plurality of media streaming devices, each including a video transmission channel and an audio return channel; and
a bidirectional switch including a video path and an audio path;
wherein the video path is configured to selectively couple the video input port of the HDMI testing device to a video transmission channel of a selected one of the plurality of media streaming devices; and wherein the audio path is configured to concurrently couple the audio output port of the HDMI testing device to the audio return channel of each of the plurality of media streaming devices, regardless of a switching state of the video path of the bidirectional switch.

14. The bidirectional media communication channel testing platform of claim 13, wherein the video path is configured to selectively couple the video input port of the HDMI testing device to the video transmission channel of the selected one of the plurality of media streaming devices in response to a control signal from the HDMI testing device.

15. The bidirectional media communication channel testing platform of claim 14, wherein the control signal from the HDMI testing device is configured to successively select each of the plurality of media streaming devices for execution of an HDMI test.

16. The bidirectional media communication channel testing platform of claim 13, wherein:

each of the plurality of media streaming devices is configured to selectively transmit a transition-minimized differential signal (TMDS) video test pattern across the video path; and each of the plurality of media streaming devices is configured to receive an enhanced audio return channel (eARC) audio test pattern across the audio path.

* * * * *